United States Patent [19]

MacLeod

[11] Patent Number: 5,364,204
[45] Date of Patent: Nov. 15, 1994

[54] COVER FOR AN AREA OF GROUND

[75] Inventor: Iain M. MacLeod, Derby, England

[73] Assignee: Terraplas Limited, South Normanton, England

[21] Appl. No.: 934,674

[22] PCT Filed: Feb. 27, 1991

[86] PCT No.: PCT/GB91/00303

§ 371 Date: Sep. 2, 1992

§ 102(e) Date: Sep. 2, 1992

[87] PCT Pub. No.: WO91/13208

PCT Pub. Date: Sep. 5, 1991

[30] Foreign Application Priority Data

Mar. 2, 1990 [GB] United Kingdom ................. 9004795

[51] Int. Cl.⁵ ............................................. E01C 5/20
[52] U.S. Cl. ........................................ 404/35; 404/41; 52/180
[58] Field of Search ................. 404/35, 36, 40, 41; 52/177, 588, 180

[56] References Cited

U.S. PATENT DOCUMENTS

| 2,377,211 | 5/1945 | Cocken | 404/40 |
|---|---|---|---|
| 3,438,312 | 4/1969 | Becker et al. | 52/177 |
| 4,018,944 | 4/1977 | Hallstrom et al. | 52/177 X |
| 4,226,064 | 10/1980 | Kraayenhof | 404/35 X |
| 4,436,779 | 3/1984 | Menconi et al. | 404/41 X |
| 4,468,910 | 9/1984 | Morrison | 404/36 X |
| 4,478,901 | 10/1984 | Dickens et al. | 404/36 X |
| 4,584,221 | 4/1986 | Kung | 52/177 X |
| 4,596,731 | 6/1986 | Cudmore et al. | |
| 4,604,962 | 8/1986 | Guibault | 404/40 X |
| 4,621,942 | 11/1986 | Hill | 404/36 X |
| 4,807,412 | 2/1989 | Frederiksen | 52/177 |
| 4,826,351 | 5/1989 | Haberhauer et al. | 404/35 |
| 4,930,286 | 6/1990 | Kotler | 404/41 X |

FOREIGN PATENT DOCUMENTS

| 0044371 | 7/1980 | European Pat. Off. | E04F 15/02 |
|---|---|---|---|
| 0133556 | 2/1985 | European Pat. Off. | 52/177 |
| 0224095 | 11/1986 | European Pat. Off. | E01C 9/08 |
| 1784228 | 9/1971 | Germany . | |
| 2529199 | 7/1975 | Germany | E01C 5/20 |
| 1122009 | 10/1965 | United Kingdom | A63C 19/04 |
| 1600823 | 1/1978 | United Kingdom | E04F 15/10 |
| 2063328 | 9/1979 | United Kingdom | E04F 15/02 |
| 2072246 | 8/1980 | United Kingdom | E01C 9/08 |
| 2103262 | 6/1982 | United Kingdom | E01C 9/00 |
| WO85/05397 | 12/1985 | WIPO | E04F 15/02 |

Primary Examiner—Ramon S. Britts
Assistant Examiner—James A. Lisehora
Attorney, Agent, or Firm—W. Thad Adams, III

[57] ABSTRACT

A cover unit 12 adapted to interlock with other such units having a top surface 14 capable of supporting persons. The unit 12 is formed of semi-opaque plastics material thereby providing for a required reduced amount of light to reach any plants located beneath the unit 12. A grid is provided by a plurality of recesses 18, 20 on the surface 14, the recesses 18, 20 accepting liquids thereby permitting evaporation and run-off of the liquids from the unit 12. A framework of ribs 22 is provided on the underside of each unit 12. Locating means may be provided on the ribs 22 in the form of spikes 24 or alternatively feet 224. The locating means are shaped to engage the ground beneath the unit 12 substantially without causing damage thereto. A plurality of ports 28 extend through the unit 12 enabling plants beneath the unit 12 to breathe. The ports 28 and recesses 18, 20 are of a size to be bridged by footwear.

29 Claims, 8 Drawing Sheets

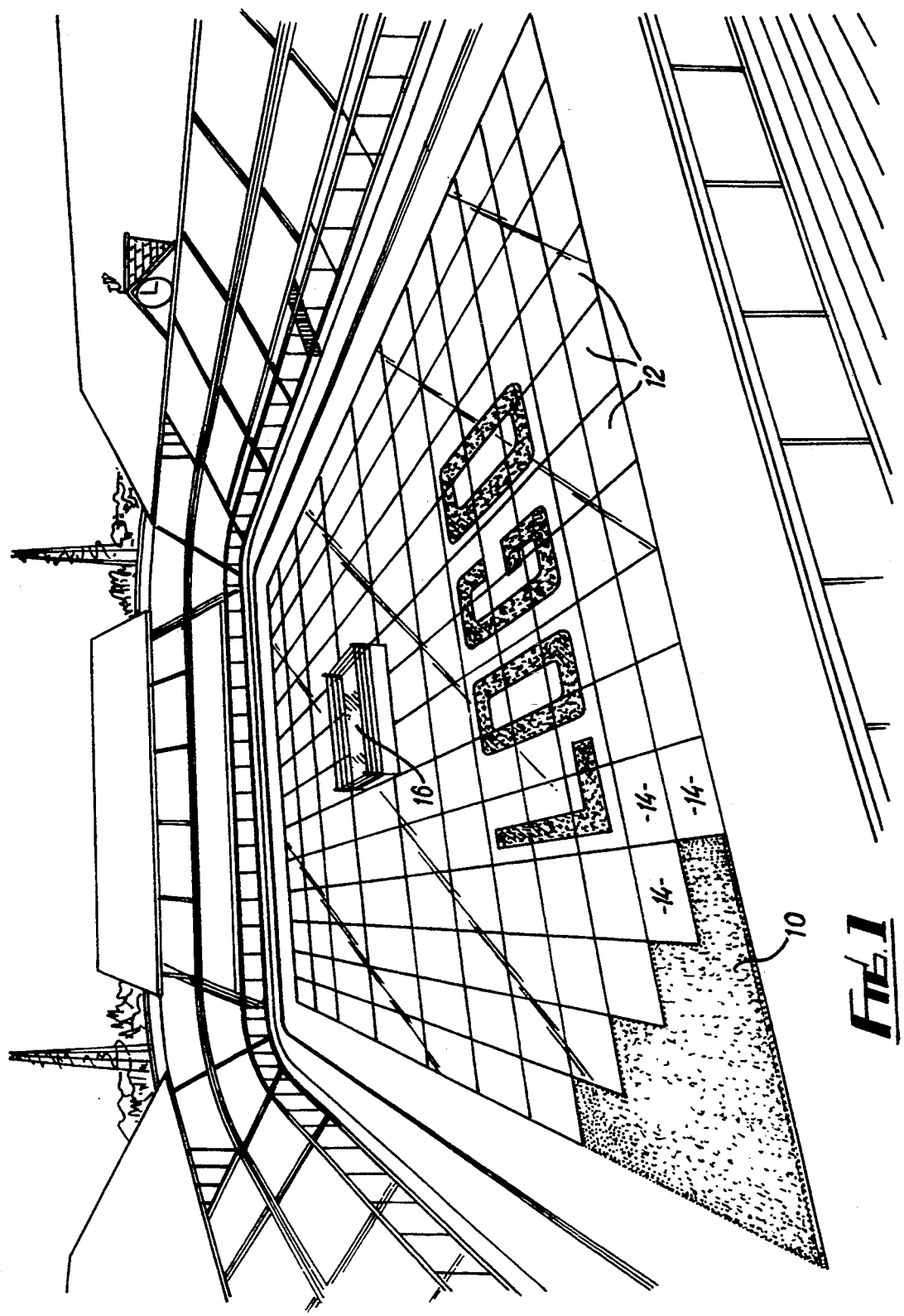

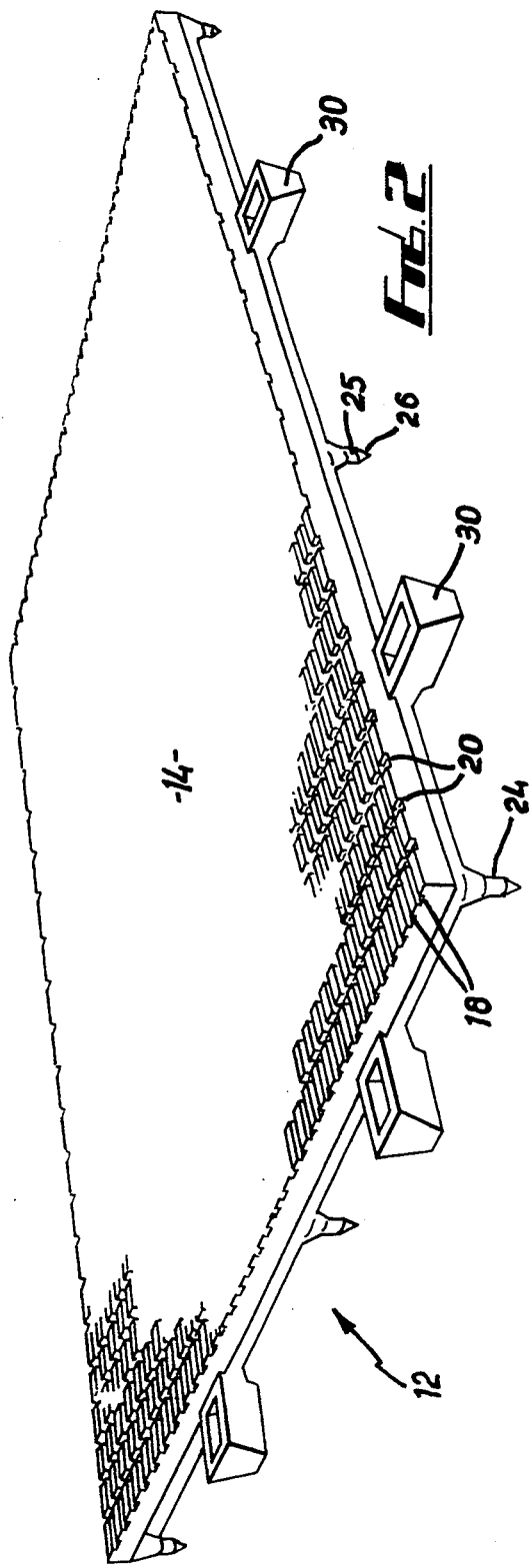
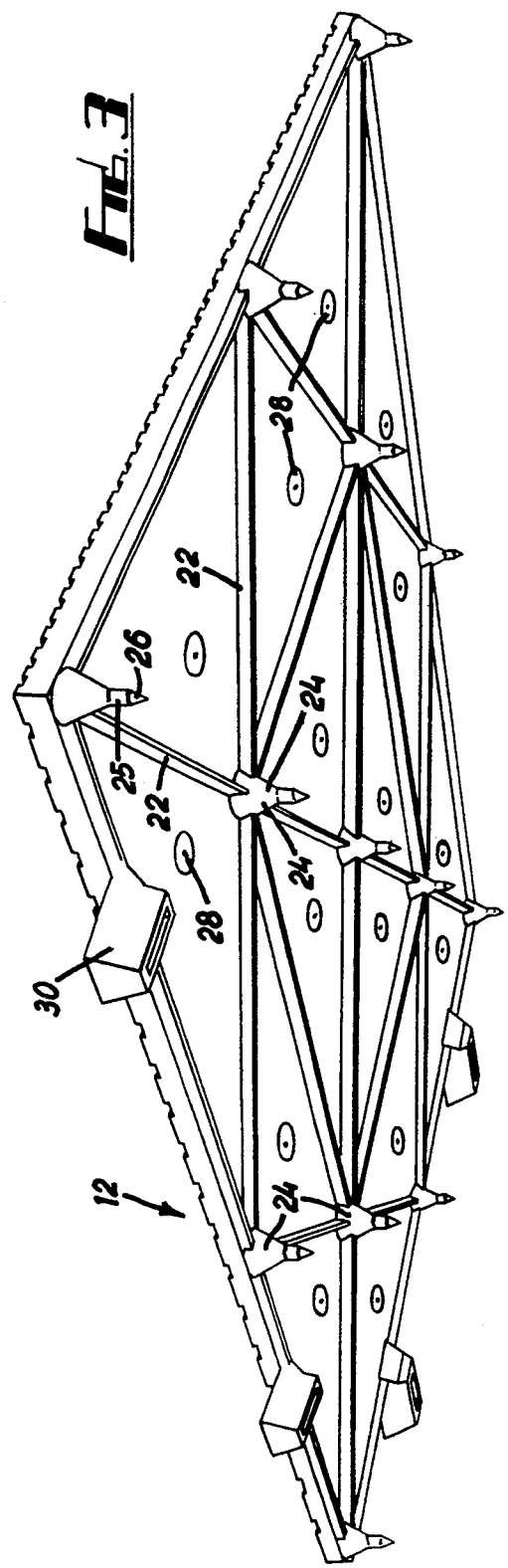

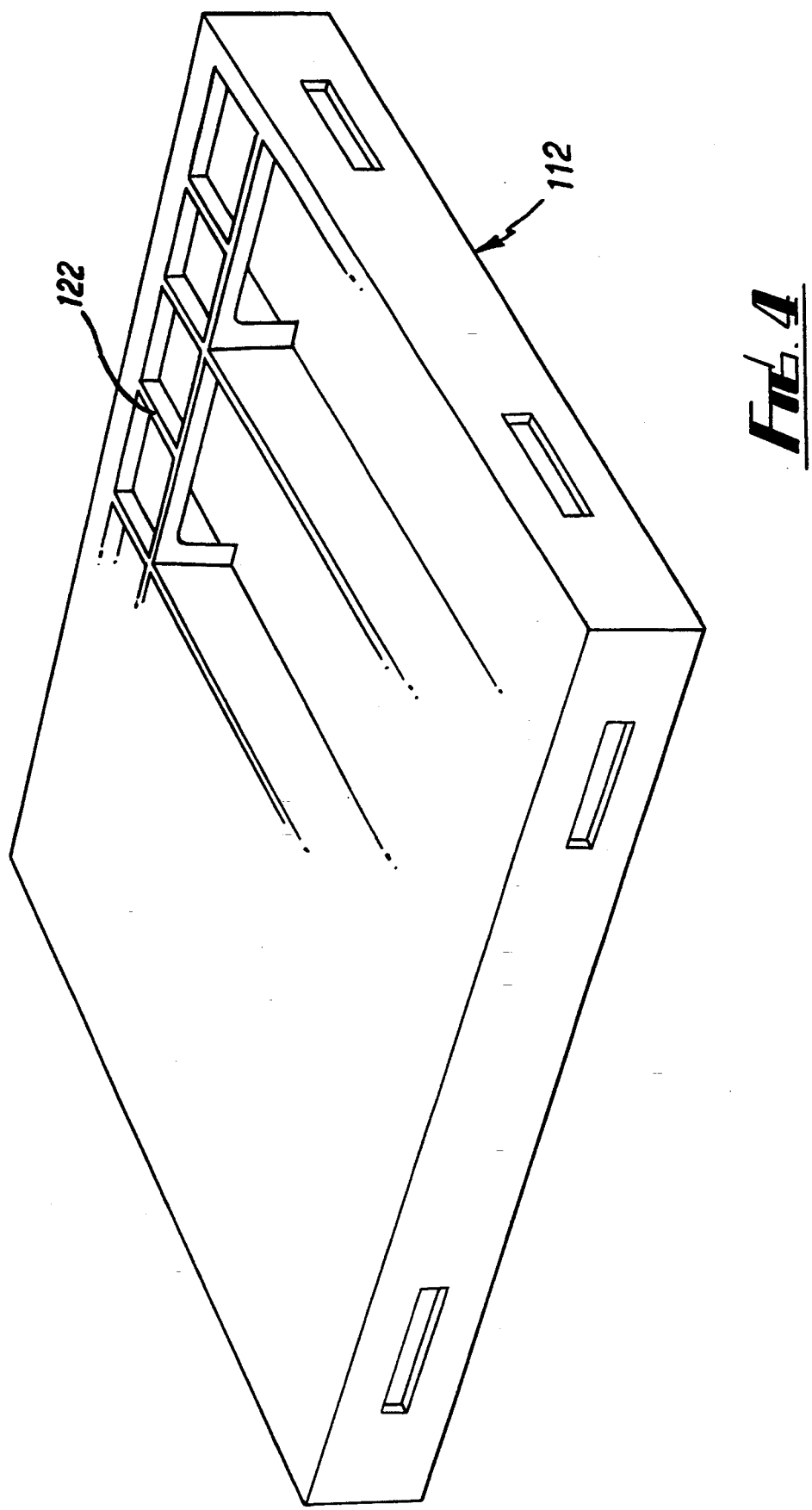

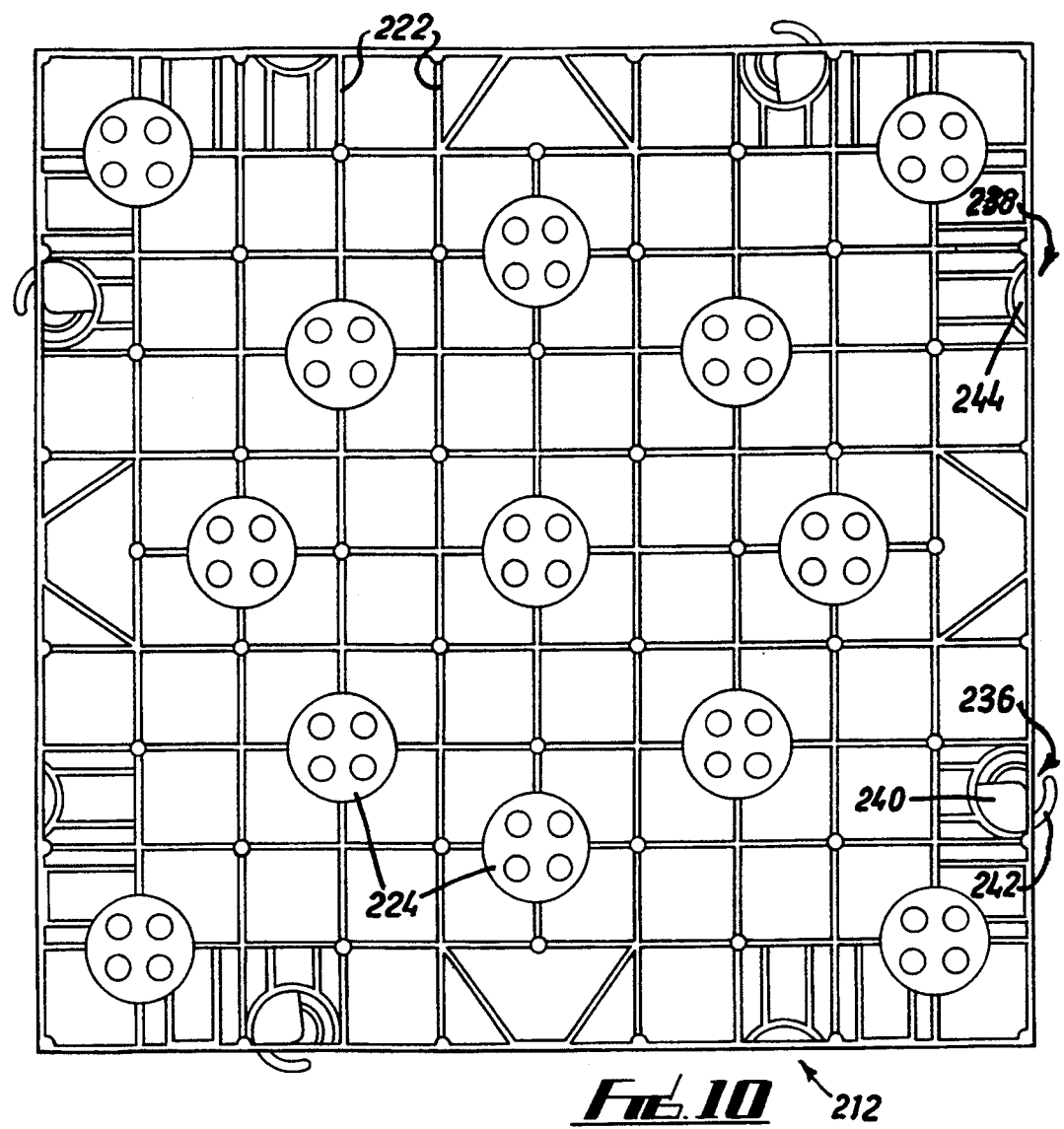
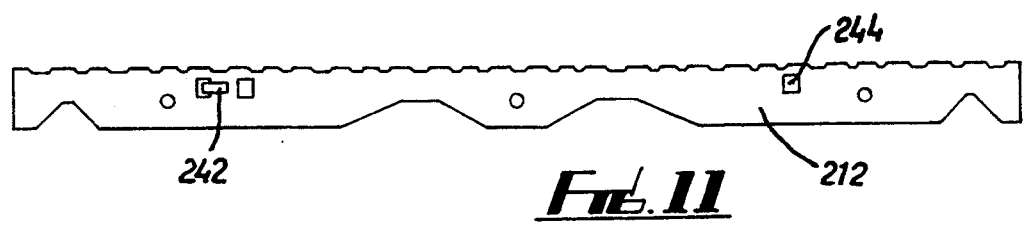

COVER FOR AN AREA OF GROUND

This invention relates to apparatus for covering an area of ground and is particularly concerned with apparatus for covering any area of ground that needs protection from pedestrians or vehicular traffic etc. such that the area of ground can be used for other purposes. An example of this is a sports pitch such as a football pitch which can be converted for other uses.

Sports stadiums having a grassed area for football, rugby or the like provide good facilities and sufficient capacity for presenting other sports or entertainments such as boxing matches, pop concerts and the like. However to avoid damage to the grass pitch, it is necessary to cover the pitch with temporary flooring. Existing types of flooring have heretofore not been designed with any particular attention to the care of the pitch, and pitch problems can easily arise.

According to the present invention there is provided apparatus for temporarily covering an area of ground, the apparatus comprising means defining a substantially continuous surface capable of supporting one or more persons thereon above the area of ground, characterised in that the apparatus also comprises means engageable with the ground to locate the apparatus thereon with minimal damage thereto, and means enabling continued growth of plants in said area when covered by the apparatus.

Preferably the surface defining means comprises a substantially planar member, said surface of which has the form of a grid. The latter is defined by recesses which are so dimensioned that the recesses are bridged by footwear and thus do not affect walking on the grid. The recesses may extend across the whole width of the planar member to provide drainage therefrom.

Preferably also the locating means comprises a plurality of spikes, each of which is so shaped as to penetrate the area of ground without shear and thus without damage thereto. The spikes may include an annular flange locatable adjacent the planar member. The flange may curve towards the planar member and be deformable under load towards a planar alignment.

Alternatively the locating means may comprise feet. The feet may have rounded edges to prevent damage to the ground. One or more ports may be provided through the feet to aid plant growth.

The locating means may be detachably mountable on the underside of the planar member. The locating means may be mountable on strengthening ribs of the planar member and desirably at junctions between perpendicularly extending ribs.

The growth enabling means may comprise a plurality of through ports in the apparatus to allow the plants to breathe therethrough. The opening of each port on said surface may be dimensioned such as to be bridged by footwear. Further the apparatus may be formed of a semi-opaque material to allow a required reduced amount of light to pass therethrough.

Part of the surface of the planar member may be provided with a surface of increased friction. The increased friction surface may be provided in areas between recesses in which no through ports are provided. The increased friction surface may comprise a coating of a granular material.

The apparatus may be in the form of a unit with means for interlocking with one or more other such units. The interlocking means may comprise respective male and female components on respective sides of each unit. Alternatively the interlocking means may comprise components which can act as either male or female components. The interlocking components may be lockably interlocked by the action of key means.

The locating means may be locatable on the units such that locating means are provided beneath points within the body of the units, and beneath two side edges of each unit with the locating means overlapping beneath adjacent units, such that locating means are provided beneath all side edges of each unit.

The apparatus is advantageously formed of a plastics material and preferably natural co-polymer polypropylene or high density polyethylene.

Openings may be provided in side walls of the units alignable with openings in adjacent units thereby providing ventilation beneath the units. Fixing means, which may be in the form of female threaded portions, are preferably provided on the units to permit seating and the like to be attached thereto.

Embodiments of the present invention will now be described by way of example only with reference to the accompanying drawings, in which : FIG. 1 is a perspective view of a sports stadium showing the grassed area partially covered;

FIG. 2 is a top perspective view of a cover unit used in FIG. 1; FIG. 3 is a bottom perspective view of the unit of FIG. 2;

FIG. 4 is a diagrammatic top perspective view of a further cover unit according to the invention;

FIG. 10 is a diagrammatic view From beneath of a still further cover unit according to the invention;

FIG. 11 is a side view of the cover unit of FIG. 10;

Figure 5:
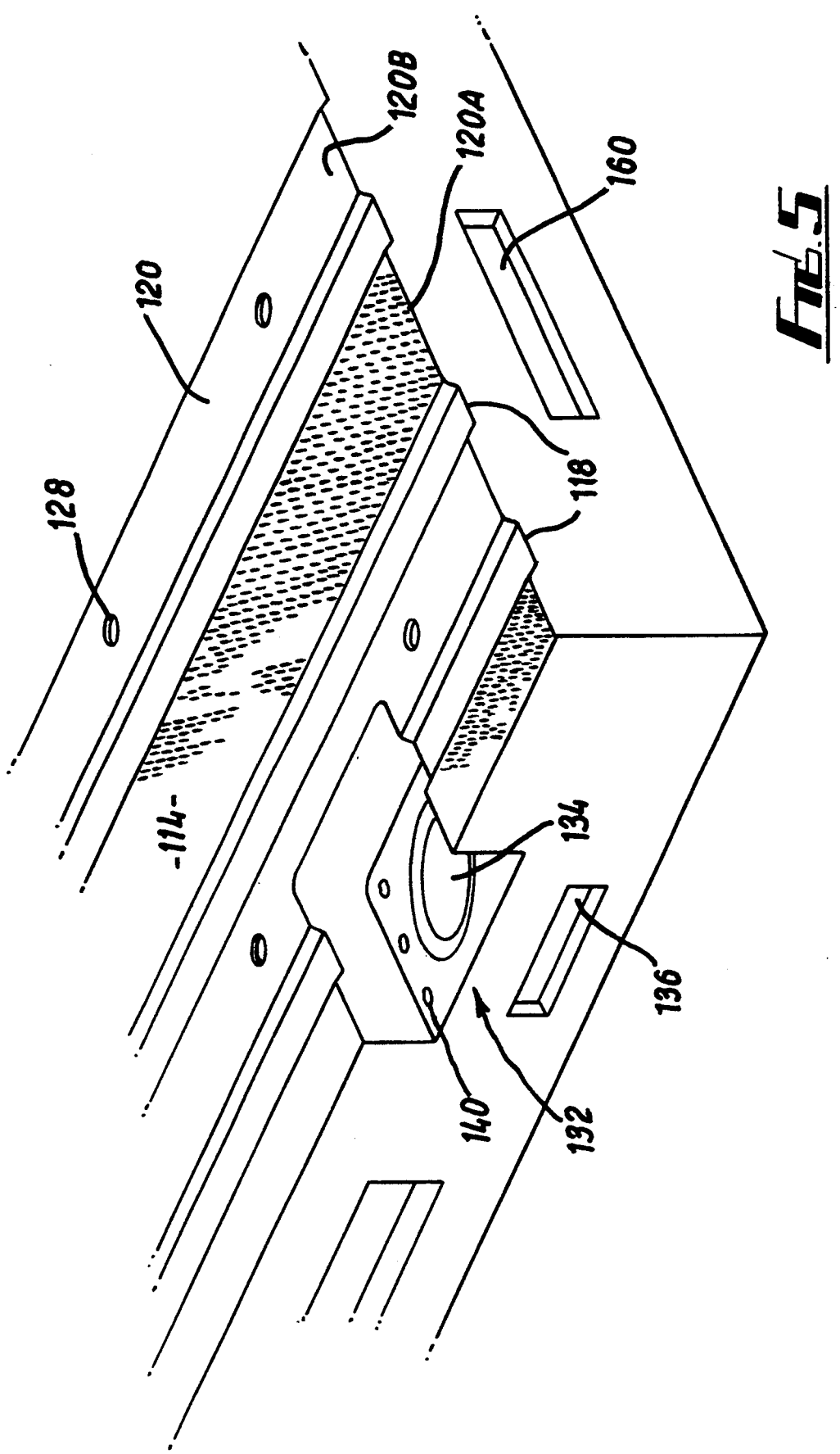
FIG. 5 is a more detailed diagrammatic top perspective view of part of the unit of FIG. 4.

Referring to FIGS. 1 to 3 of the drawings, FIG. 1 shows schematically a sports stadium presenting a grassed area 10 which is shown almost completely covered by a plurality of cover units 12 adapted to interlock with one another. Each unit 12 provides a top surface 14 capable of supporting persons, for example spectators to a boxing match, and a structure such as a boxing ring 16.

Each of the units 12 (FIGS. 2 and 3) is preferably formed as a one piece unit, for example being moulded from a plastics material such as glass reinforced copolymer polypropylene, The plastics may be semi-opaque for a purpose hereinafter described and can be printed upon, for example by screen printing, when in situ if required, FIG. 1 showing the word LOGO so printed.

Each unit 12 is of generally square configuration and has on its surface 14 a plurality of longitudinal and transverse recesses 18,20 intersecting to form a grid. The recesses are of such width, for example 1 mm, as to ensure that footwear, including all types of ladies' shoes, will bridge the recesses and not locate in same which might otherwise cause injury to the wearer. The recesses 18,20 provide a grid which can receive liquids such as rain and carry the liquids along the recesses to enable the liquids to evaporate quickly and thus prevent the surface 14 from becoming wet and slippery.

On its underside each unit 12 is formed with a supporting framework of ribs 22. Each of the latter presents an arcuate profile downwardly of the unit 12 so that if the ribs 22 come into contact with the grass when the unit 12 is in position, the ribs 22 are not in shear and therefore do not damage the grass. At each junction of the ribs 22, the unit 12 is provided with a downwardly extending spike 24 of substantially inverted conical form with a lower cylindrical section 25 and a pointed end 26. Each spike 24 may be approximately 15 mm in length and 10 mm in diameter at the top. When the unit 12 is located on the grassed area, the pointed ends 26 and sections 25 penetrate the grass to a sufficient extent to stablize the unit 12. The design of the spikes 24 is such that, while holes are made in the grass, there is no shearing. While the spikes 24 thus maintain the unit 12 properly in location, the grassed area is not damaged by the spikes 24.

At various locations between the ribs 22, there are provided ports 28 extending through the unit 12 to enable the grass beneath the latter Lo breathe when the unit 12 is in position. Each breathing port 28 is preferably of substantially conical form but at its apex terminating in a cylindrical section which opens onto the surface 14 with a small diameter, for example 4 mm. This diameter prevents footwear such as ladies' stiletto heels from engaging in the breathing ports 28, thus again preventing injury. The small diameter cylindrical sections also minimise seepage and spoilage through the unit 12 which might otherwise have a detrimental effect on the grass.

When the plastics material of the unit 12 is semi-opaque, this allows an nominal acceptable required amount of light to pass through the unit 12. The acceptable level of light which does pass through enables photosynthesis to continue whilst grass is covered by the unit 12, while the reflection of most of the light avoids overheating up of the grass. The unit 12 can provide a temporary cover for a considerable number of days without having any damaging effect on the grass.

To enable interlocking of units across the area of the grass, each unit 12 may be provided with a pair of female components spaced along each of two adjacent edges and extending outwardly from the respective edges. Each female component 30 is shown to be rectangular in plan, but it is preferred that each female component 30 has a conical cross section so as to again be able to penetrate the grass without any shearing. It will be appreciated that the male components, which are not shown in the drawings, are complementary in shape to the female components 30 so as to locate therein for interlocking purposes. The interlocking preferably is designed to give sufficient flexibility in the joints between adjacent units 12. Each unit 12 may occupy an area for example of one square meter and the units 12 may be made available in assemblies of six units in a three by two configuration, preferably glued together.

FIGS. 4 to 9 show a further cover unit 112 and components for use therewith. Each unit 112 provides a top surface 114 which is best illustrated in FIG. 5, the surface 114 having been removed from FIG. 4 for clarity. The unit 112 is made in this example of co-polymer polypropylene and may be made by either the structural foam or the synpress process. A plurality of longitudinal recesses 118 are provided across the surface 114 to define elongate raised areas 120. The recesses 118 are again of such width to ensure that footwear bridges the recess and does not locate therein. Alternate ones 120A of the raised areas are provided with an abrasive coating to provide a gripping surface. The abrasive coating comprises a layer of bauxite aggregate which is adhered to the areas 120A in a process wherein the respective parts of the unit 112 are locally bonded with the aggregate.

Ports 128 are provided in the raised areas 120B not provided with the abrasive coating. The ports 128 are of a similar size to those in the units 12.

Figure 9:
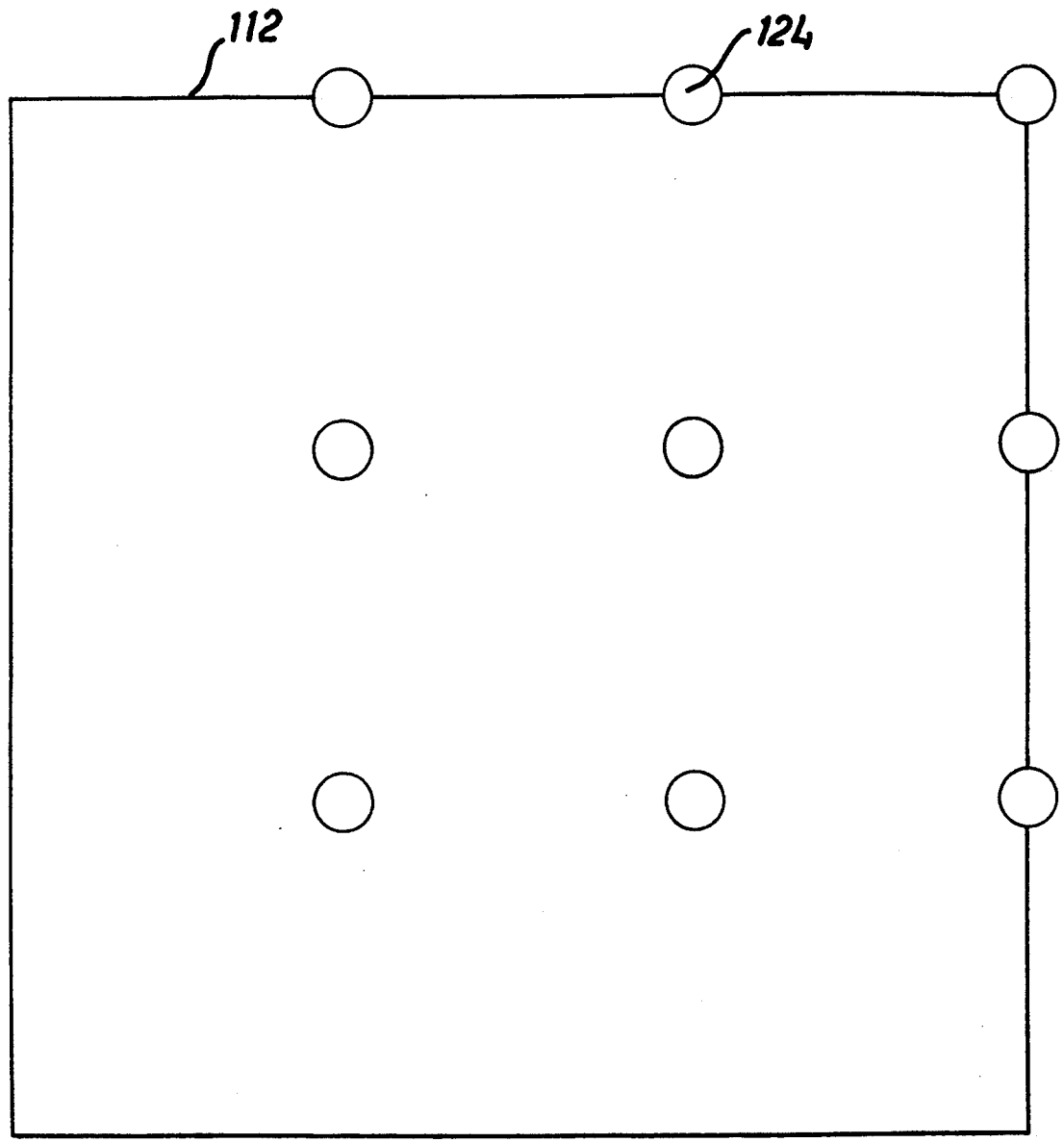
FIG. 9 is a diagrammatic view from beneath the cover unit of FIG. 4.

A supporting framework of ribs 122 is provided beneath the surface 114. A part of this framework is shown in FIG. 4. A plurality of spikes 124 are detachably mounted at junctions between perpendicular ribs 122. FIG. 9 illustrates the arrangement of such spikes 124 on the underside of a unit 112. Nine spikes 124 are provided on each unit in a square configuration equispaced from each other. The spikes 124 are spaced such that four so spaced would extend the whole length of a side of a unit 112 extending between corners thereof. The square configuration is positioned such that flanges 121 of respective spikes 124 overlie the edges of the unit 112 on two sides and one spike 124 overlies the corner between the two sides. With this configuration and with all the units 112 similarly aligned, spikes 124 on the edge of a unit 112 will overlie an edge or edges of an adjacent unit or units where no such spike 124 is provided such that four spikes 124 are provided beneath respective corners.

Figure 7:
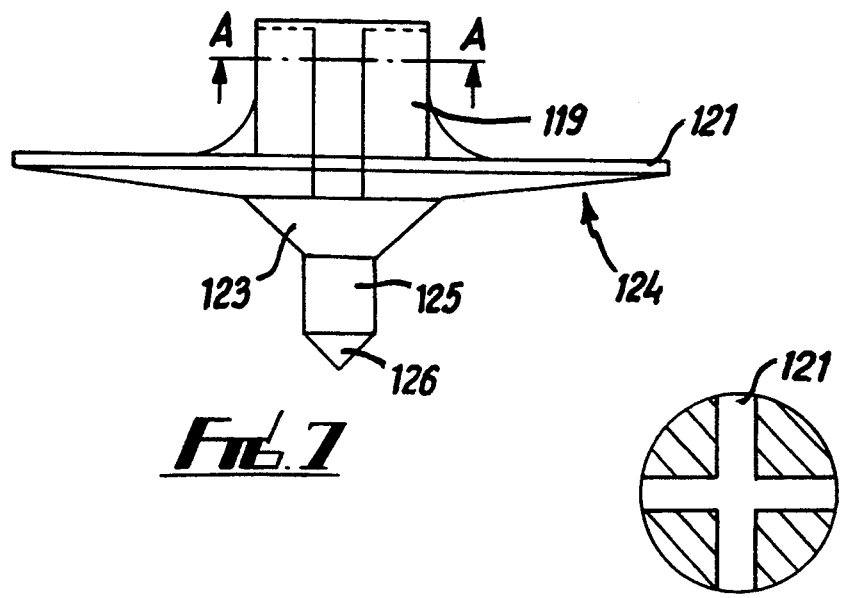
FIG. 7 is a diagrammatic side view of a further component of the unit of FIG. 4.
Figure 8:
FIG. 8 is a sectional view along the line A—A of FIG. 7.

FIGS. 7 and 8 show a spike 124 in more detail. Said spike 124 comprises an upper cylindrical portion 119 presenting a cruciform shaped upwardly facing opening 121 which slidingly fits over a junction between perpendicular ribbing 122 on a unit 112. At the lower end of the section 119 is a flange 121 curving gently away from the section 119. On the underside of the flange 121 is a frusto conical section 123 extending into a lower cylindrical section 125 and a pointed end 126. The spike 124 enters the grass without shearing similarly to the spikes 24. When high loads are placed on the spikes 124 the flange 121 will absorb the loads by tending to straighten which will not produce shearing in the ground.

Figure 6:
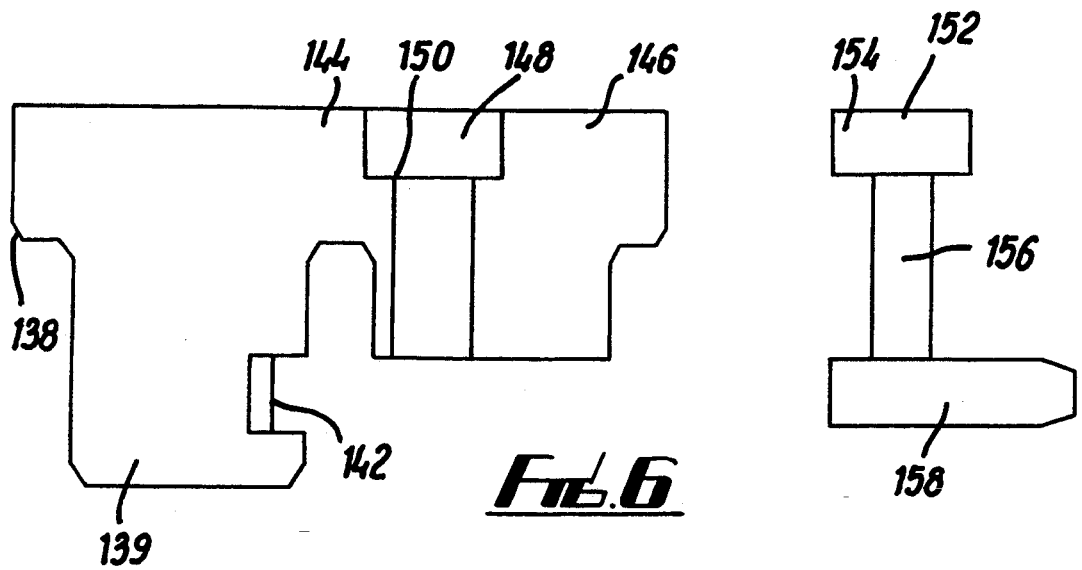
FIG. 6 is a diagrammatic side view of components of the unit of FIG. 4.

A further system of permitting adjacent units 112 to interlock is illustrated in FIGS. 5 and 6. A recessed portion 132 is provided at required locations on each unit 112 with a vertical through hole 134. An opening 136 is provided on the side of the unit 112 below the recess 132. Into one of a pair of such recesses 132 to be connected, a male member 138 is fixed by engagement of screws or the like in holes 140 around the perimeter of the recess 132. The male member 138, comprises a cylindrical part 139 locatable in the hole 134 and presenting a recess 142 facing the hole 136. The member 138 connects via a bridging portion 144 to a further member 146 locatable in the opening 134 of an adjacent unit 112. A vertical passage 148 is provided through the further member 146. The upper part of the opening 148 has a outwards step 150. A tool 152 is rotatably located in the opening 148 and has an enlarged head 154 which engages on the step 150. A cylindrical portion 156 extends from the head 154 to an eccentrically mounted disc 158. A suitably shaped recess is provided in the head 152 to permit rotation thereof by a corresponding tool (not shown) to rotate the disc 158 from a first position (as shown in FIG. 6) pointing away from the member 138, and a second position pointing theretowards engaging through the opening 136 into the recess 142 thereby locking adjacent units 112 together.

Two rectangular openings 160 are provided on each side wall of the unit 112. The openings 160 on adjacent units align with each other to provide cross-ventilation therebeneath. An upwardly opening female threaded portion (not shown) is provided in the centre of the units 112 to permit seating and the like to be mounted thereon. When not in use a plug may be fitted therein.

FIGS. 10 to 13 show a still further cover unit 212. The top surface of the unit 212 is similar to the top surface 114 of the unit 112. A square supporting framework of ribs 222 is provided on the underside of the unit 212. A plurality of feet 224 are detachably mounted at junctions between intersecting ribs 222. As shown in FIG. 10 thirteen substantiality equispaced feet 224 are provided on each unit 212.

Figure 12:
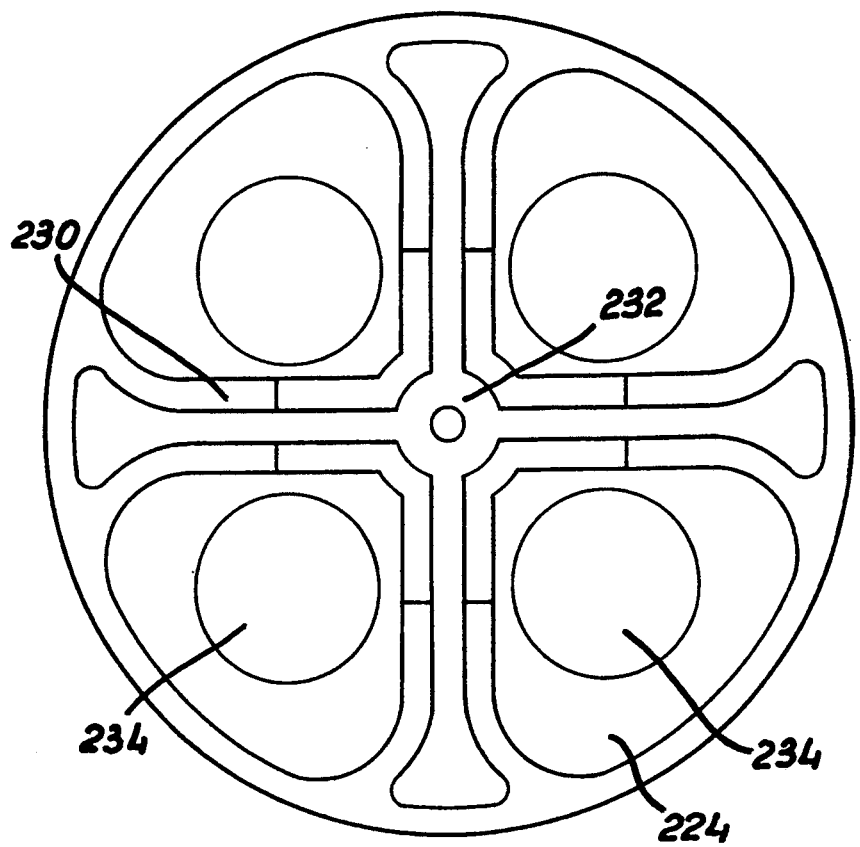
FIG. 12 is a plan view of a component of the unit of FIG. 10.
Figure 13:
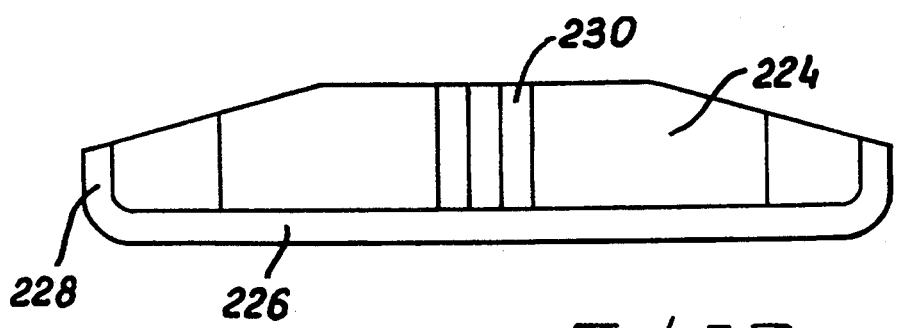
FIG. 13 is a side view of the component of FIG. 12

FIGS. 12 and 13 show a foot 224 in more detail. The foot 224 comprises a circular base 226 with rounded upturned edges 228. Four upstanding limbs 230 on the base 226 are shaped to define a substantially cruciform upwardly facing slot 232 permitting mounting of the foot 224 at junctions between the ribs 222, Circular openings 234 are provided through the base 226 in the areas between the limbs 230.

A still further system of interlocking is shown in FIG. 10 comprising male and female arrangements 236 and 238 provided around the edge of the unit 212. The male arrangement 236 comprise a part circular pivotally mounted component 240 movable from a first position fully contained within the unit 212 and a second position in which an arcuate finger 242 extends from the edge of the unit 212. The female arrangement 238 comprises an arcuate slot 244 corresponding in shape to the finger 242 to locate same therein when in the second position to provide interlocking. The units 212 may be semi permanently connected by bolts. It has been found particularly useful for handling purposes to connect the units 212 together in this manner four meter squares.

Various other modifications may be made without departing from the invention. For example the units may be made of a material other than those described, and may have a configuration other than as described. Also the interlocking arrangement may differ from the described arrangements.

One or more of the units may be provided with one or more sloped side edges to permit wheel chairs and other wheeled vehicles to gain access on to the apparatus. One or more of the units may be strengthened to accept greater loads by filling the spaces between the supporting ribs with a load bearing material such as for example high density polyethylene or structural polystyrene, or air bags in the form of high density polyethylene air filled sealed units. Such strengthened units could be used for example as a road way or vehicular parking surface. The interconnecting means may be double handed to permit the units to be used in any alignment.

I claim:

1. Apparatus for temporarily covering an area of ground and which is reusable at the same or another location, said apparatus comprising:
   (a) covering means for defining a surface capable of supporting one or more persons thereon above the area of ground;
   (b) said covering means defining therein a plurality of holes extending therethrough to permit air to reach plants covered by said apparatus, said holes being of a size sufficiently small to be bridged by footwear;
   (c) locating means for locating said apparatus on the ground, said locating means comprising a downwardly extending member for locating said covering means in spaced apart relation to the ground, said locating means further including feet extending transversely from said downwardly extending member to be capable of spreading load applied to said covering means away from said downwardly extending member;
   (d) light-admitting means for enabling continued growth of plants in said area when covered by said apparatus.

2. Apparatus according to claim 1, wherein said feet have rounded edges to prevent damage to the ground.

3. Apparatus according to claim 1, wherein one or more ports are provided through said feet to aid plant growth.

4. Apparatus according to claim 1, wherein said covering means comprises strengthening ribs, and said feet are mountable on said strengthening ribs.

5. Apparatus according to claim 1, wherein said covering means comprises a substantially planar member with an upper surface and an underside, said upper surface having the form of a grid.

6. Apparatus according to claim 5, wherein said recesses extend across the whole extent of said planar member to provide drainage therefrom.

7. Apparatus according to claim 1, wherein a part of said upper surface of said planar member includes friction-inducing means for providing enhanced traction.

8. Apparatus according to claim 7, wherein said friction-inducing means comprises a coating of a granular material.

9. Apparatus according to claim 1, wherein said apparatus comprises a plurality of units with sides and side walls, and interlocking means provided on each said unit for interlocking with one or more other such said units.

10. Apparatus according to claim 9, wherein said interlocking means comprises components which can act as either male or female components.

11. Apparatus according to claim 9, wherein said interlocking means comprises components which can be lockably interlocked by the action of a key means.

12. Apparatus according to claim 9, wherein openings are provided in said side walls of said units, said openings being aligned with such said openings in adjacent such said units, thereby providing ventilation beneath said units.

13. Apparatus according to claim 1, wherein said apparatus is formed of a plastics material.

14. Apparatus according to claim 13, wherein said apparatus is formed of natural co-polymer polypropylene.

15. Apparatus according to claim 13, wherein said apparatus is formed of high density polyethylene.

16. Apparatus for temporarily covering an area of ground and which is reusable at the same or another location, said apparatus comprising:
   (a) covering means for defining a surface capable of supporting one or more persons thereon above the area of ground;
   (b) said covering means defining therein a plurality of holes extending therethrough to permit air to reach plants covered by said apparatus, said holes being of a size sufficiently small to be bridged by footwear;

(c) locating means for locating said apparatus on the ground, said locating means comprising a downwardly extending member for locating said-covering means in spaced apart relation to the ground, said locating means further including a flange extending transversely from said downwardly extending member to be capable of spreading load applied to said covering means away from said downwardly extending member;

(d) light-admitting means for enabling continued growth of plants in said area when covered by said apparatus.

17. Apparatus according to claim 16, wherein said locating means comprises a plurality of spikes, each of said spiles including an annular flange.

18. Apparatus according to claim 17, wherein said annular flange curves towards said covering means and is deformable under load towards a planar alignment.

19. Apparatus according to claim 16, wherein said covering means comprises a substantially planar member with an upper surface and an underside, said upper surface having the form of a grid.

20. Apparatus according to claim 18, wherein said recesses extend across the whole extent of said planar member to provide drainage therefrom.

21. Apparatus according to claim 16, wherein a part of said upper surface of said planar member includes a friction-inducing means for providing enhanced traction.

22. Apparatus according to claim 21, wherein said friction inducing means comprises a coating of a granular material.

23. Apparatus according to claim 16, wherein said apparatus comprises a plurality of units with sides and side walls, and interlocking means provided on each said unit for interlocking with one or more other such said units.

24. Apparatus according to claim 23, wherein said interlocking means comprises components which can act as either male or female components.

25. Apparatus according to claim 23, wherein said interlocking means comprises components which can be lockably interlocked by the action of a key means.

26. Apparatus according to claim 23, wherein openings are provided in said side walls of said units, said openings being with such said openings in adjacent such said units, thereby providing ventilation beneath said units.

27. Apparatus according to claim 16, wherein said apparatus is formed of a plastics material.

28. Apparatus according to claim 27, wherein said apparatus is formed of natural co-polymer.

29. Apparatus according to claim 27, wherein said apparatus is formed of high density polyethylene.

* * * * *